(12) United States Patent
Nett et al.

(10) Patent No.: US 10,954,821 B2
(45) Date of Patent: Mar. 23, 2021

(54) TURBINE CASING AND TURBINE HAVING SUCH A TURBINE CASING

(71) Applicant: Duerr Systems AG, Bietigheim-Bissingen (DE)

(72) Inventors: Moritz Nett, Muehlacker (DE); Josip Kutnjak, Stuttgart (DE); Urs Ertel, Ditzingen-Heimerdingen (DE); Axel Widenhorn, Stuttgart (DE); Philipp Biewer, Bonn (DE); Fabian Uhlig, Munich (DE)

(73) Assignee: Duerr Systems AG, Bietigheim-Bissingen (DE)

( * ) Notice: Subject to any disclaimer, the term of this patent is extended or adjusted under 35 U.S.C. 154(b) by 0 days.

(21) Appl. No.: 16/198,656

(22) Filed: Nov. 21, 2018

(65) Prior Publication Data
US 2019/0093511 A1    Mar. 28, 2019

Related U.S. Application Data

(63) Continuation of application No. PCT/DE2017/000137, filed on May 19, 2017.

(30) Foreign Application Priority Data

May 21, 2016 (DE) .......................... 102016006357.2

(51) Int. Cl.
*F01D 25/24* (2006.01)
*F01D 9/02* (2006.01)

(52) U.S. Cl.
CPC ........... *F01D 25/243* (2013.01); *F01D 9/026* (2013.01); *F05D 2230/642* (2013.01); *F05D 2250/82* (2013.01); *Y02E 20/14* (2013.01)

(58) Field of Classification Search
CPC ...... F01D 25/243; F01D 25/08; F01D 25/145; F01D 9/026
See application file for complete search history.

(56) References Cited

U.S. PATENT DOCUMENTS 7,008,182 B2 *   3/2006   Kopp ...................... F01D 9/026
                                                           415/136
7,797,936 B2 *   9/2010   Hayashi .................. F02B 39/00
                                                            60/602

(Continued)

FOREIGN PATENT DOCUMENTS

DE     102008000849 A1    10/2009
DE     102010056557 A1    7/2012

(Continued)

OTHER PUBLICATIONS

International search report dated Aug. 28, 2017 of international patent application PCT/DE2017/000137 on which this application is based.

*Primary Examiner* — Eldon T Brockman
*Assistant Examiner* — Michael K. Reitz
(74) *Attorney, Agent, or Firm* — Walter Ottesen, P.A.

(57) ABSTRACT

The invention is directed to a turbine having a turbine housing or casing. The turbine housing includes a carrier ring and a ring contour component which is fastened to the carrier ring. The ring contour component has a circumferential flange with which it bears against an annular end face of the carrier ring. At least one hold down is provided which enables the flange of the ring contour component to be releasably fixed against the end face of the carrier ring. The turbine is configured to be part of a micro gas turbine in a combined heat and power cogeneration system.

9 Claims, 4 Drawing Sheets

(56) References Cited

U.S. PATENT DOCUMENTS

| 9,845,770 B2 | 12/2017 | Martinez-Botas et al. |
| 2013/0078083 A1 | 3/2013 | Barthelet et al. |
| 2014/0130351 A1 | 5/2014 | Holroyd |
| 2016/0265379 A1* | 9/2016 | Annati .................... F01D 9/045 |
| 2016/0281648 A1* | 9/2016 | Annati .................. F16C 35/067 |

FOREIGN PATENT DOCUMENTS

| DE | 102012110329 A1 | 4/2014 |
| EP | 1965029 A1 | 9/2008 |
| EP | 1965037 A1 | 9/2008 |
| JP | 2003278505 A | 10/2003 |
| WO | 2014140598 A1 | 9/2014 |

\* cited by examiner

TURBINE CASING AND TURBINE HAVING SUCH A TURBINE CASING

CROSS REFERENCE TO RELATED APPLICATION

This application is a continuation application of international patent application PCT/DE2017/000137, filed May 19, 2017, designating the United States and claiming priority from German application 10 2016 006 357.2, filed May 21, 2016, and the entire content of both applications is incorporated herein by reference.

FIELD OF THE INVENTION

The invention relates to a turbine casing or housing for a turbine, in particular of a micro gas turbine, and to a turbine having a turbine casing of this type.

BACKGROUND OF THE INVENTION

Combined heat and power cogeneration systems are increasingly being used for the decentralized supply, for example, of companies with electric, thermal and/or mechanical energy, which combined heat and power cogeneration systems are operated by way of an internal combustion engine, in particular in the form of a micro gas turbine. Micro gas turbines of this type are gas turbines of the lower performance class, that is, up to approximately 500 kW nominal output. In addition to the micro gas turbine itself, combined heat and power cogeneration systems of this type also comprise, in a known configuration, a power converter which can be driven by the micro gas turbine, in particular in the form of an electric generator, and a waste heat apparatus for the utilization of the waste heat which is contained in the exhaust gas of the internal combustion engine.

A micro gas turbine is typically based on a single shaft system, the compressor, the turbine and the generator being attached on a central shaft. A high degree of fuel utilization is absolutely necessary for satisfactory economic efficiency. As a measure to increase the degree of fuel utilization, the micro gas turbines are provided with a recuperator. The recuperator is a heat exchanger which is as a rule integrated into the system, by which the thermal energy of the exhaust gas being transferred to the compressed combustion air. The combustion air which is compressed in the compressor and is preheated as a result is therefore heated further in the recuperator. In the combustion chamber, fuel is added to the compressed and preheated air and is burned, as a result of which the temperature increases further. By way of the expansion of the exhaust gas which is produced in the turbine, the energy is converted into mechanical energy, by way of which the compressor and the generator are driven.

The requirements of a system of this type are not restricted, however, merely to a high degree of fuel utilization. For practical operation, the maintenance complexity has to be kept low, which requires a satisfactory accessibility of the individual components. For example, the turbine has to be capable of being dismantled easily. An easy dismantling capability of this type conflicts, however, with the parallel requirement for high operational reliability under thermal loading. The turbine is namely subject to high and, moreover, fluctuating operating temperatures, which makes a releasable configuration of individual component connections difficult. The conflicting requirement profile relates, in particular, to the casing of a turbine, which casing is exposed directly to the hot exhaust gas stream and therefore to the corresponding thermal loadings.

A turbine casing typically comprises a carrier ring and a ring contour component which is fastened to the carrier ring, the ring contour component enclosing the turbine wheel of the turbine in a flow-guiding manner, by its shape following the contour of the turbine wheel. The fastening of the ring contour component to the carrier ring can take place, for example, by way of a bayonet connection which, following axial plugging on and a rotational movement, is first of all locked in a positively locking manner. In addition, however, an additional positional securing means is required, to which end a spot welded securing ring can be used. Although a connection of this type may withstand the thermal loads, it is complicated to manufacture and, moreover, is not releasable in practice. For maintenance-induced dismantling, the spot welds have to be opened in a complicated manner. It has been shown, moreover, that the bayonet connection tends to fuse to the components at the high operating temperatures, which makes dismantling in accordance with maintenance even more difficult.

SUMMARY OF THE INVENTION

In view of the above, it is an object of the invention to provide a turbine casing and a turbine having a casing of this type which is easy to disassemble while maintaining a high operational reliability and temperature resilience.

According to a feature of the invention, the ring contour component has a circumferential flange, by way of which it bears against an annular end face of the carrier ring. Here, at least one hold-down is provided, by means of which the flange of the ring contour component is fixed releasably against the end face of the carrier ring. It has been shown that, as a result, firstly a thermally highly resilient connection can be realized which secondly can be released reliably, for example for maintenance work.

In one advantageous embodiment of the invention, the turbine casing also comprises a surrounding casing, the carrier ring being held on the surrounding casing via at least three connecting elements by way of in each case one bearing which can be displaced in the longitudinal direction of the respective connecting element. The displaceable bearing firstly and the limited cross section of the respective connecting element secondly both bring about a satisfactory and mutually supplementary thermal insulation of the surrounding casing with respect to the structural unit which is very hot during operation and comprises the carrier ring and the ring contour component. The last-mentioned structural unit is exposed directly to the hot gas stream. As a consequence of the heat flow from the hot structural unit to the surrounding casing, which heat flow is very limited in accordance with the invention, the thermal loading is lowered considerably. Operation at comparatively very high hot gas temperatures is thus possible. The configuration according to the invention permits turbine inlet temperatures of up to 950° C. or more, which leads to temperatures at the carrier ring in the region of the displaceable bearing of from 800 to 850° C. Despite high values of this type, the temperatures at the surrounding casing were able to be limited to not more than from 200 to 250° C., which corresponds to a temperature drop along the bearing of a surprising 600° C. Moreover, the satisfactory insulation effect contributes to reduced temperature gradients being produced within the structural unit comprising the carrier ring and the ring contour component. In conjunction with the freely displaceable bearing, thermal stresses are reduced to a minimum as a result.

The turbine casing according to the invention has a longitudinal axis. The at least three connecting elements are preferably oriented radially with respect to the longitudinal axis. This results in a spatially exactly defined positioning of the structural unit relative to the surrounding casing, it accordingly being possible for thermally induced diameter changes to be compensated for readily. Here, the at least three connecting elements are expediently configured as locating pins which are guided in locating bores of the carrier ring. The required material cross sections and the associated thermal conduction are reduced to a minimum.

The surrounding casing preferably comprises a main body and an intermediate ring which is fastened to it, the connecting elements being held on the intermediate ring. Here, the intermediate ring lies on the main body by means of a structured surface, in particular in the form of ribs which are spaced apart from one another. This contributes to the reduction of the thermal transfer and therefore to the thermal decoupling of the surrounding casing from the carrier ring. In addition, it can also be expedient that the fastening region of the connecting elements on the surrounding casing is covered at least partially by means of a thermal insulation with respect to the structural unit comprising the carrier ring and the ring contour component. An input of heat which goes beyond the connecting elements into the surrounding casing via convection and/or thermal radiation is reliably reduced to a minimum as a result.

In one advantageous embodiment of the invention, the carrier ring has a circumferential wall which projects beyond the annular end face in the axial direction, and which engages around the flange of the ring contour component in a centering manner. This achieves a situation where the function of the at least one hold-down can be reduced to the generation of the necessary contact pressure, whereas the exact positional orientation of the ring contour component with respect to the carrier ring is ensured by way of the combination of the flange, the end face and the circumferential wall. As a consequence of the abovementioned functional separation, the hold-down or hold-downs can be configured such that they are simple and releasable without problems, while an exact component positioning is nevertheless achieved.

In one advantageous embodiment, at least one hold-down receptacle, in particular in the form of a circumferential radial groove, is formed on the inner side of the circumferential wall, at least two axially braced pressure plates being provided as a hold-down, which pressure plates are held in the at least one hold-down receptacle and are braced against the flange of the ring contour component by means of screws. In one expedient embodiment, a plurality of pressure plates which are distributed, in particular, uniformly over the circumference are preferably provided in the form of ring segments. At least one depression is preferably formed on the flange of the ring contour component, into which depression the screws engage. As a consequence of the axial bracing, a gastight connection can be produced between the ring contour component and the carrier ring, which gastight connection maintains its seal despite the releasability of the pressure plates, even in the case of high temperature fluctuations. The uniform distribution of a plurality of pressure plates over the circumference, in particular in conjunction with the ring segment shape, ensures a uniform surface pressure without discontinuities, with the result that even local leaks are avoided reliably. The at least one depression on the flange of the ring contour component contributes to a tilting-free bracing operation of the screws.

In one expedient embodiment, the ring contour component has a shoulder radially on the inner side of its flange. In the mounted state, the shoulder, the flange and the axially projecting circumferential wall of the carrier ring form an annularly circumferential groove, in which the at least two pressure plates come to lie. The groove permits provisional fixing of the pressure plates even in the case of a screw connection which has not been tightened, with the result that mounting and dismantling are facilitated.

In one preferred alternative to the above-described pressure plate connection, stay bolts with external threads project from the annular end face, onto which stay bolts nuts are screwed for axial bracing of the ring contour component against the end face of the carrier ring. The contrary requirements firstly for thermally loadable bracing and secondly for reliable releasability of the connection can be readily met as a result.

In a further preferred variant, a circumferential radial groove is formed on the inner side of the axially projecting circumferential wall of the carrier ring. Here, the hold-down is configured in the form of a circlip which is held in the radial groove, and which fixes the flange of the ring contour component against the end face of the carrier ring. The circlip firstly ensures a hold-down force which is distributed very uniformly over the circumference and is maintained reliably even in the case of high and changing temperature loads. Secondly, a circlip of this type can be released easily and also remounted, which contributes to the reduction of the maintenance complexity.

The connection according to the invention optionally permits the positioning of a seal and/or at least one spacer plate between the flange of the ring contour component and the end face of the carrier ring. As a result, the seal against the hot gases which are guided by the turbine casing can firstly be ensured, and axial fine positioning of the ring contour component with respect to the carrier ring can secondly be achieved.

It can be sufficient that the function of the carrier ring is limited to holding and positioning the ring contour component. In one preferred embodiment, the carrier ring is configured as a guide ring with inlet vanes. As a result, it assumes the positional fixing of the ring contour component and the production of an exact incident flow of the turbine wheel which is mounted in the turbine casing, in a dual function.

The turbine casing according to the invention comes into consideration fundamentally for all turbines and, in particular, gas turbines. The turbine according to the invention is preferably part of a micro gas turbine, in particular in a combined heat and power cogeneration system, the advantages which are achieved of an operationally reliable but releasable connection coming particularly into effect. This applies, in particular, to a configuration, in the case of which the turbine is a radial turbine or a mixed flow turbine, the ring contour component enclosing a turbine wheel of the turbine in a flow-guiding manner.

It is to be noted at this point that it can also be advantageous fundamentally and independently of the casing construction of the turbine, for a micro gas turbine, in particular in a combined heat and power cogeneration system, to embody or configure the turbine as a mixed flow turbine, and/or to provide a mixed flow turbine wheel as an energy converter, expander or turbine wheel in a micro gas turbine. Here, the degree of efficiency of the micro gas turbine system or the combined heat and power cogeneration system can advantageously be increased over a wide operating range by way of a mixed flow turbine wheel in a micro gas turbine. Here, an operating range is to be understood to mean, in particular, an adjustable, controllable and/or regulatable variation of an effective output ratio of thermal effective output which is provided by way of the micro gas turbine system or the combined heat and power cogeneration system to a mechanical and/or electric effective output which is provided in parallel. The operating range is understood to mean, in particular, a limited parameter range, within the boundaries of which the effective output ratio can be set. Moreover, on account of a blade inlet edge which is not of a radial configuration, a mixed flow turbine allows an advantageously more favorable incident flow in the case of relatively high throughflow values than the radial turbines which have previously been used in micro gas turbines. Finally, the rotor-dynamic properties and/or the transient behavior of the turbomachine are advantageously improved by way of a mixed flow turbine wheel in a micro gas turbine, on account of a lower moment of inertia in comparison with radial turbines which are known in micro gas turbines.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
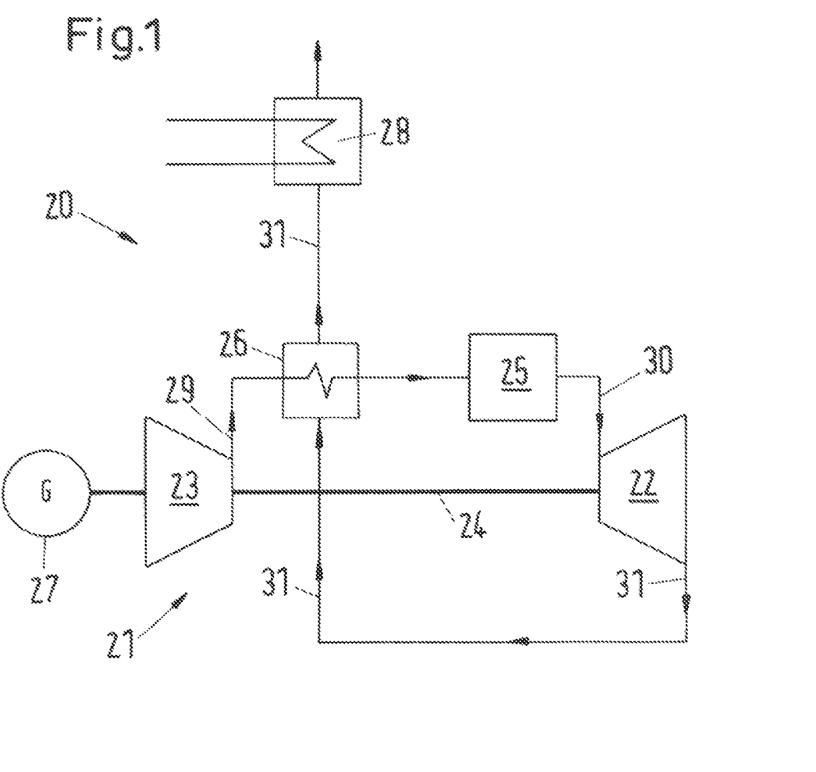
FIG. 1 shows a schematic block circuit diagram of a combined heat and power cogeneration system which is driven by a micro gas turbine.

FIG. 1 shows a schematic block circuit diagram of a combined heat and power cogeneration system 20 which comprises a micro gas turbine 21, a power converter 27 which is drive-connected to the micro gas turbine 21, a waste heat apparatus which is fed by the micro gas turbine 21, in particular for heating an optionally provided heat exchanger 28, and a recuperator 26. The nominal output of the micro gas turbine 21 preferably lies in a range of from 25 kW inclusive to 500 kW inclusive.

The micro gas turbine 21 is configured as a single shaft turbine with a central and continuous turbine shaft 24 and, furthermore, comprises a compressor 23 which is driven by the turbine shaft 24 for an oxidizing agent stream, here for a combustion air stream 29, a combustion chamber system 25 for the combustion of fuel with the compressed combustion air stream 29, and a turbine 22 which drives the turbine shaft 24 and is fueled by way of the combustion chamber system 25 for the relaxation of a compressed and warm hot gas stream 30 which is produced with simultaneous generation of mechanical energy. As a consequence of the oxidation of the fuel with the oxygen of the combustion air stream 29, the hot and pressurized hot gas stream 30 is produced in the combustion chamber system 25, which hot gas stream 30 is expanded in the turbine 22. As a result, a turbine wheel 33 (shown in FIG. 2) and the turbine shaft 24, which is fixedly connected to the turbine wheel so as to rotate, are driven rotationally, the turbine shaft 24 for its part driving a compressor wheel (not shown in the drawing) of the compressor 23 which is connected fixedly to it so as to rotate with it. Moreover, the power converter 27, which is likewise drive-connected to the turbine shaft 24, is driven. The power converter 27 is an electric generator G for the production of electric energy in the preferred embodiment which is shown, but can also be another type of machine, for example, for the provision of mechanical energy, or a combination of the two.

The hot gas stream 30 leaves the turbine 22 as an expanded exhaust gas stream 31, and is subsequently guided through the optionally provided recuperator 26 and/or the likewise optionally provided heat exchanger 28. By means of the heat exchanger 28, thermal output is removed from the exhaust gas stream 31 and is fed to the heat user. In the case of one embodiment of the waste heat apparatus without a heat exchanger 28, the exhaust gas stream 31 can also be used directly, for example, for a drying process.

By means of the compressor 23, combustion air is sucked in from the surroundings. It can be expedient to use the sucked-in combustion air at the same time as cooling air for the power converter 27. In this case, the sucked-in combustion air experiences a first preheating operation. The combustion air is compressed in the compressor 23 to produce the abovementioned combustion air stream 29 at approximately 4 bar pressure and is preheated in the process to approximately 220° C. The compressed and preheated combustion air stream 29 is guided through a combustion air region of the recuperator 26. In the recuperator 26 which acts as a heat exchanger, thermal energy is removed from the exhaust gas stream 31 and is fed to the combustion air stream 29 which is additionally heated to approximately 600° C. as a result, optionally up to 620° C. In this state, the combustion air stream 29 is guided into the combustion chamber system 25, where its oxidation or combustion takes place with the addition of fuel, and as a consequence of which the above-described hot gas stream 30 for the drive of the turbine 22 is produced.

Figure 2:
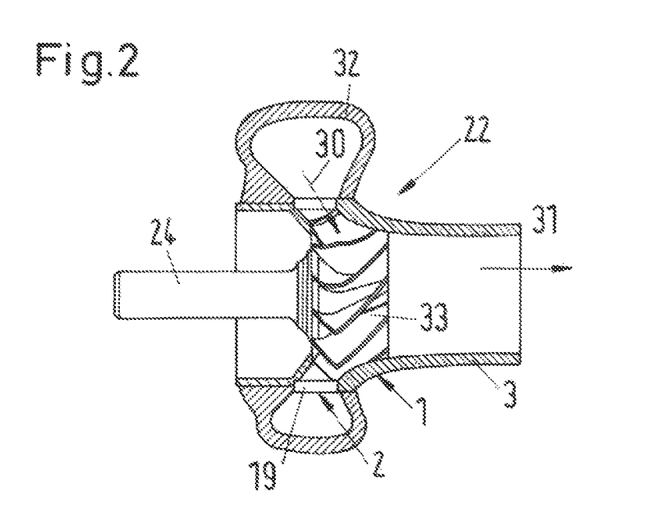
FIG. 2 is a schematic longitudinal sectional illustration of the turbine, configured as a mixed flow turbine, of the combined heat and power cogeneration system in accordance with FIG. 1, having a turbine casing which is configured according to the invention.

FIG. 2 shows a schematic longitudinal sectional illustration of the turbine 22 of the combined heat and power cogeneration system 20 in accordance with FIG. 1, with a turbine casing 1 which is configured in accordance with the invention. The turbine casing 1 comprises an inlet casing 32, a carrier ring 2 which is configured as a guide ring with schematically indicated inlet vanes 19, and a ring contour component 3 which encloses a turbine wheel 33 of the turbine 22 in a flow-guiding manner. The inlet casing 32 encloses the inlet vanes 19 of the carrier ring 2 in a worm-shaped manner, which inlet vanes 19 are arranged distributed over the circumference. By means of the inlet casing 32, the above-described hot gas stream 30 is guided through between the inlet vanes 19 to the turbine wheel 33. Here, the inlet vanes 19 give the hot gas stream 30 a swirl which is suitable for the optimum incident flow of the turbine wheel 33. The ring contour component 3 of the turbine casing 1 guides the hot gas stream 30 through the blade system of the turbine wheel 33 radially from the outside toward the inside and, moreover, deflects it in an axial direction. Here, the hot gas stream 30 is expanded in the turbine 22 and leaves the latter, guided by the ring contour component 3, as an exhaust gas stream 31 in a direction substantially coaxially with respect to the turbine shaft 24, it also being possible, however, for the exhaust gas stream 31 to contain a residual swirl.

In the embodiment in accordance with FIG. 2, the hot gas stream 30 is fed to the turbine wheel 33 with a combined radial and axial direction component; accordingly, the turbine 22 which is shown is a mixed flow turbine. It can also be a radial turbine, however, with a predominantly radial feed of the hot gas stream 30. Mixed flow turbines can in principle be used in all embodiments of micro gas turbines 21. The use of mixed flow turbines is advantageous, in particular, however, in applications, in which the range of a satisfactory degree of efficiency is to be shifted toward higher throughflow values, in which relatively high pressure conditions prevail, in which a transient behavior which is as satisfactory and rapid as possible is desired, or in which positive incident flow angles at the turbine inlet are desired or necessary.

Mixed flow turbines of the type which is shown here can be manufactured by means of a very wide variety of manufacturing methods. These include, inter alia, metallic casting, ceramic manufacturing methods, rapid manufacturing, such as selective laser sintering, machining methods and forming methods such as forging. A very wide variety of high temperature (super) alloys or ceramics can be used as materials.

It is likewise conceivable within the context of the invention to configure mixed flow turbines with integrated cooling ducts as a precondition for it being possible to further raise the turbine inlet temperature, with the result that the thermal degree of efficiency of the turbine can be increased.

That portion of the turbine casing 1 which encloses the carrier ring 2 and the ring contour component 3 is shown merely schematically without details in FIG. 2. A first embodiment thereof which is configured in accordance with the invention is shown in a perspective view in FIG. 3 and as an exploded illustration in FIG. 4. It can be seen with simultaneous reference to FIGS. 3 and 4 that the carrier ring 2 is configured as a guide ring with inlet vanes 19. The ring contour component 3 is connected releasably to the carrier ring 2. To this end, the ring contour component 3 has a circumferential flange 5, by way of which it bears against an annular end face 4 of the carrier ring 2 with a seal 17 optionally positioned in between.

Figure 3:
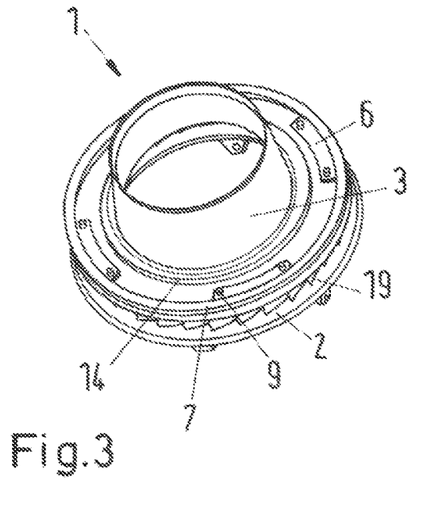
FIG. 3 is a perspective view of a first embodiment of the turbine casing of the turbine in accordance with FIG. 2, with screwed pressure plates as a hold-down for a ring contour component on a carrier ring of the turbine casing.
Figure 4:
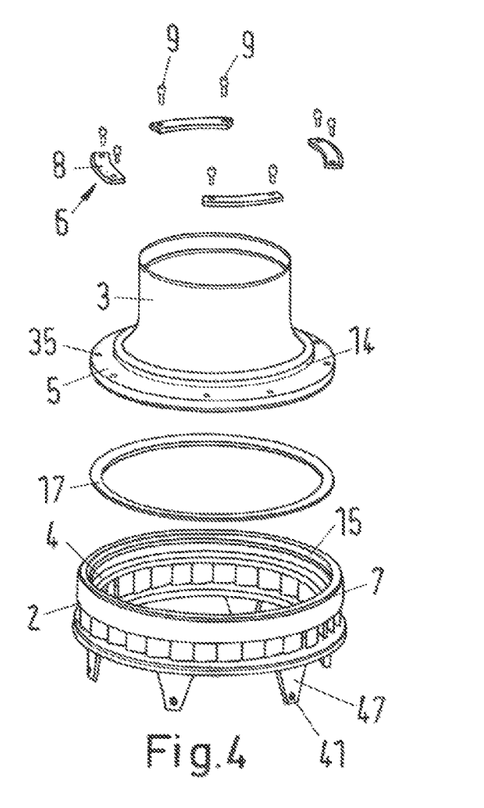
FIG. 4 is an exploded view of the turbine casing in accordance with FIG. 3 with details with respect to the screw connection of the pressure plates and a seal which is positioned between the ring contour component and the carrier ring.

For the releasable fixing of the flange 5 of the ring contour component 3 against the end face 4 of the carrier ring 2, at least one or, here, a plurality of hold-downs 6 are provided which are formed by way of at least two axially braced pressure plates 8 in the embodiment in accordance with FIGS. 3 and 4. In the preferred embodiment which is shown, there are a plurality of, by way of example four here, pressure plates 8 which are distributed uniformly over the circumference and are configured in accordance with the contour of the flange 5 as ring segments. Another number can also be expedient, however. Moreover, it is possible to provide an approximately C-shaped ring which is circumferential in a partially closed manner, instead of individual ring segments.

Figure 5:
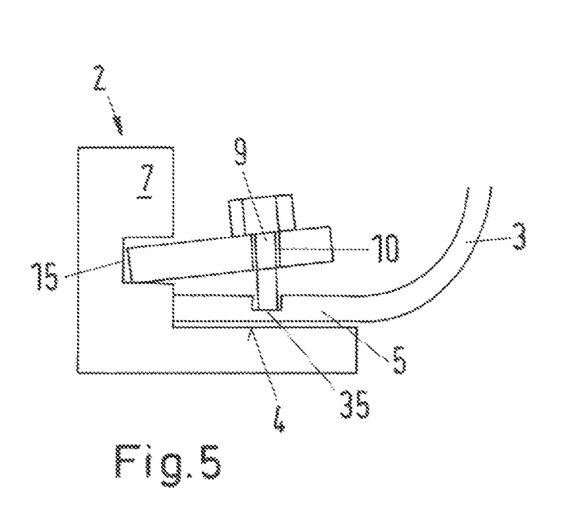
FIG. 5 is a schematic longitudinal sectional illustration of the flange region of the ring contour component in accordance with FIGS. 3 and 4, with details with respect to the fastening of the pressure plates in a ring groove of a carrier ring.

Furthermore, FIG. 5 also shows a schematic longitudinal sectional illustration of the flange region of the ring contour component 3 in accordance with FIGS. 3 and 4 with details in respect of the fastening of the pressure plates 8 in a hold-down receptacle of the carrier ring 2. It can be seen from the combination of FIGS. 3, 4 and 5 that the carrier ring 2 has a circumferential wall 7 which projects in the axial direction beyond the annular end face 4, and which engages around the flange 5 of the ring contour component 3 in a centering manner. Moreover, the ring contour component 3 has an axially projecting shoulder 14 radially on the inner side of its flange 5, which shoulder 14, in the mounted state, forms a circumferential groove which is open in the axial direction together with the flange 5 and the axially projecting inner face of the circumferential wall 7 of the carrier ring 2. The pressure plates 8 come to lie in the circumferential groove.

At least one hold-down receptacle is formed on the radially inwardly pointing inner face of the circumferential wall 7 of the carrier ring 2. A plurality of hold-down receptacles of this type, for example in the form of separate pockets, can be provided, into which the hold-downs 6 are inserted. In the preferred embodiment which is shown, the hold-down receptacle is formed by way of a radially inwardly open, circumferential radial groove 15, the clear height of which corresponds to the thickness of the hold-downs 6 or the pressure plates 8. The pressure plates 8 are inserted radially from the inside into the radial groove 15 and, as viewed in the longitudinal section in accordance with FIG. 5, project radially inward beyond the inner face of the circumferential wall 7. Here, the radial groove 15 forms a clamping means for the pressure plates 8, which clamping means can be subjected to bending loads. In their projecting part, the pressure plates 8 are provided with continuous threaded bores 10, through which threaded fasteners 9 are screwed with their thread. At least one depression 35 is formed on the flange 5 of the ring contour component 3, which depression 35 can be configured, for example, in the form of an axially upwardly open circumferential groove. In the embodiment which is shown, in each case one depression 35 in the form of a blind bore is provided for each of the total of eight threaded fasteners 9, the free ends of the threaded fasteners 9, which ends project downward out of the pressure plates, engaging into in each case one of the depressions 35.

An annularly circumferential seal 17 is optionally also positioned between the flange 5 of the ring contour component 3 and the end face 4 of the carrier ring 2. The temperature-stable seal 17 can be a flat seal or an O-ring seal made from suitable materials, and is configured as a metallic C-ring seal in the embodiment which is shown. Moreover, a spacer plate 18 can optionally be positioned between the flange 5 of the ring contour component 3 and the end face 4 of the carrier ring 2 in accordance with the illustration in accordance with FIG. 5. Depending on requirements, a plurality of spacer plates 18 can also be stacked above one another in order to produce the desired thickness and in order to set the desired axial relative position of the ring contour component 3 with respect to the carrier ring 2. At any rate, on account of their flexurally stiff clamping in the circumferential wall 7, the pressure plates 8 act as counter-bearings for the threaded fasteners 9 which can be tightened in the threaded bores 10. The ring contour component 3 is braced with its flange 5 against the end face 4 of the carrier ring 2 in a gastight but releasable manner by way of tightening of the threaded fasteners 9 in the pressure plate 8 which are clamped in a flexurally stiff manner. After the release of the threaded fasteners 9 and the removal of the pressure plates 8, the ring contour component 3 can be lifted up from the carrier ring 2, which leads to easy accessibility of the turbine 22 (FIG. 2) in the case of maintenance work.

Figure 6:
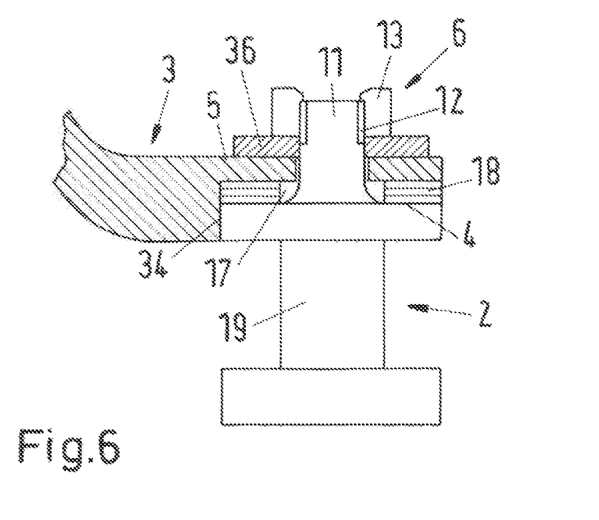
FIG. 6 is a schematic longitudinal sectional illustration of the flange region of a ring contour component with stay bolts instead of screws for axially bracing the ring contour component against the carrier ring.

FIG. 6 shows a schematic longitudinal sectional illustration of one variant of the embodiment in accordance with FIGS. 3 to 5 in the connecting region between the ring contour component 3 and the carrier ring 2. In accordance with FIGS. 3 and 4, the carrier ring 2 comprises inlet vanes 19 which are distributed over the circumference, and an upper and annularly circumferential end face 4. No outer, axially projecting circumferential wall 7 in accordance with FIGS. 3 and 4 is provided, however, for centering the ring contour component 3. Rather, the ring contour component 3 instead has a centering shoulder 34 which projects axially toward the carrier ring 2 radially on the inner side of the flange 5, which centering shoulder 34 bears radially on the inner side against the carrier ring 2 in a manner which adjoins the end face 4 and ensures centering of the ring contour component 3 with respect to the carrier ring 2. Moreover, instead of the threaded fasteners 9 (FIGS. 3 and 4), studs 11 are provided in a corresponding number and spatial distribution for the axial bracing of the pressure plates 8. The studs 11 project in the axial direction out of the annular setting face 4 of the carrier ring 2, and are guided through corresponding bores in the flange 5 of the ring contour component 3. At their free ends, the studs 11 carry external threads 12, onto which nuts 13 are threadably engaged with washers 36 placed in between. Together with their optional washers 36, the nuts 13 form in each case one hold-down 6. Just like the threaded fasteners 9 in accordance with FIGS. 3 to 5, the nuts 13 can be tightened and released, as a result of which the ring contour component 3 can be pressed with its flange 5 against the end face 4 of the carrier ring 2, but can also be released. Furthermore, it can also be seen in FIG. 6 that the seal 17 and the stack of spacer plates 18 are not positioned above one another, but rather both bear independently of one another in the axial direction against the end face 4 of the carrier ring 2 and against the flange 5 of the ring contour component 3. This achieves a situation where, although the seal 17 can experience a certain axial contact pressure, the overall thickness of the spacer plates 18 limits the axial bracing travel, with the result that the seal 17 cannot be squeezed excessively.

Figure 7:
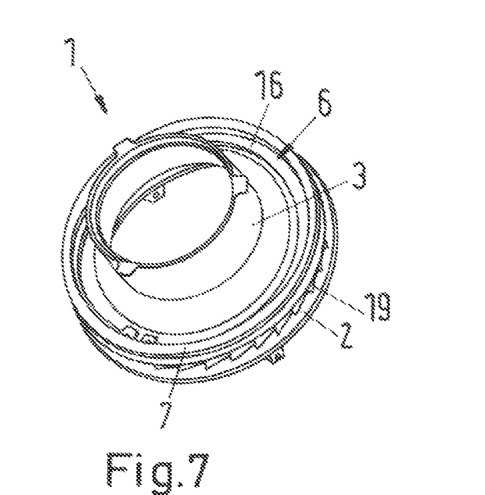
FIG. 7 is a perspective view of one variant of the turbine casing in accordance with FIG. 3, with a circlip instead of screwed pressure plates.
Figure 8:
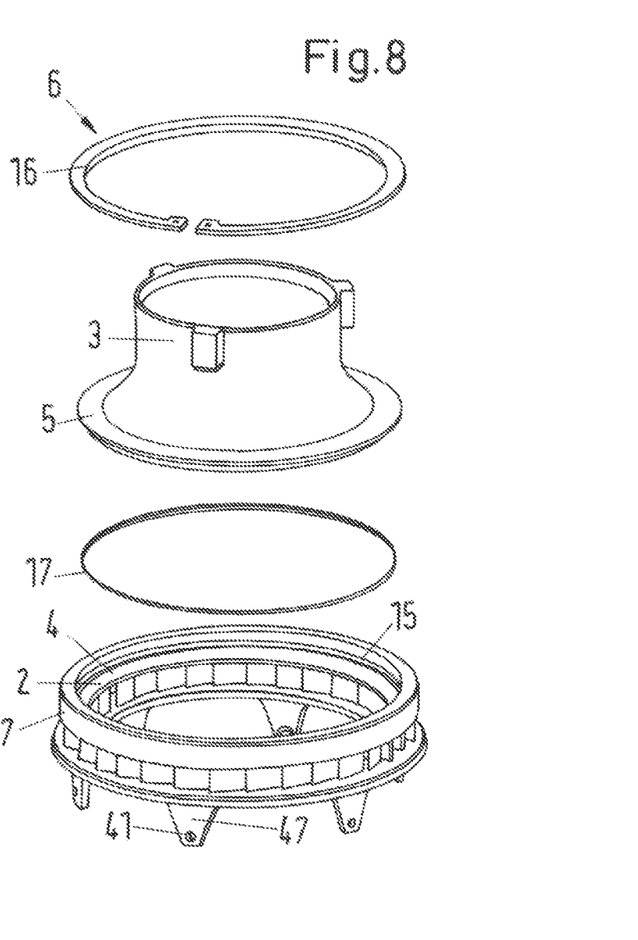
FIG. 8 is a perspective exploded illustration of the turbine casing in accordance with FIG. 7, with details with respect to the arrangement and configuration of its components; and, FIG. 9 is a schematic longitudinal sectional illustration of a turbine casing with a casing structural unit in accordance with FIG. 6, with an additional surrounding casing, and with thermally insulating connecting elements for fastening the casing structural unit to the surrounding casing.

FIG. 7 shows a perspective view of one variant of the mounted turbine casing 1 in accordance with FIG. 3, the associated individual parts being shown in the corresponding perspective exploded illustration in accordance with FIG. 8. In accordance with the above-described embodiments, the carrier ring 2 is also configured as a guide ring with inlet vanes 19 in the embodiment in accordance with FIGS. 7 and 8, the carrier ring 2 having an end face 4 for releasable contact of the flange 5 of the ring contour component 3. Moreover, a seal 17 is also positioned here between the flange 5 and the end face 4. In a deviation from the embodiments in accordance with FIGS. 3 to 6, the hold-down 6 in accordance with FIGS. 7 and 8 is configured as a circlip 16, however. The circumferential wall 7 projects beyond the annular end face 4 of the carrier ring 2 in the axial direction and also engages around the flange 5 of the ring contour component 3 here with the performance of a centering function. In addition, however, a circumferential radial groove 15 is also formed in the inner face of the circumferential wall 7 at a suitable axial spacing from the end face 4. In the mounted state, the circlip 16 is held in the radial groove 15, the flange 5 of the ring contour component 3 coming to lie axially between the end face 4 of the carrier ring 2 and the circlip 16. The axial position of the radial groove 15 relative to the end face 4 is dimensioned in such a way that the flange 5 is held during operation in a gastight manner against the end face 4, but in a releasable manner for maintenance purposes.

Figure 9:
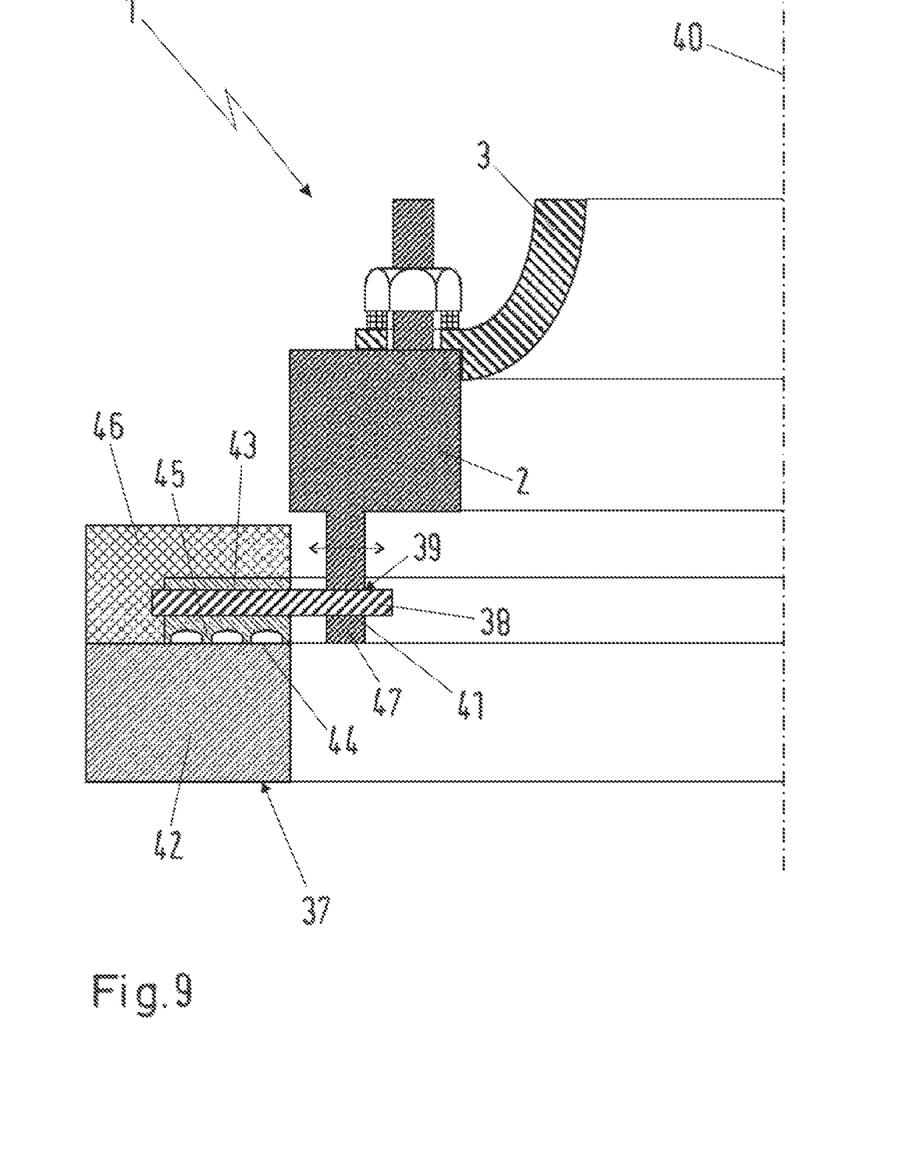

FIG. 9 shows a schematic longitudinal sectional illustration of a turbine casing 1 which comprises a casing structural unit in accordance with FIG. 6 with a carrier ring 2 and with a ring contour component 3. Moreover, the turbine casing 1 also comprises an outer surrounding casing 37 (indicated here merely schematically) which, although it is not shown in the other embodiments, is actually present in a comparable form. At any rate, the turbine casing 1 extends in all embodiments along the longitudinal axis 40 which is shown here only in FIG. 9.

In the same way as in FIGS. 4 and 8, the carrier ring 2 which is shown here has at least three, here six, lugs 47 which are distributed over the circumference and are provided with in each case one radially running locating bore 41 (FIGS. 4 and 8). They serve to fasten the casing structural unit comprising the carrier ring 2 and the ring contour component 3 to the surrounding casing 37 in a thermally insulating manner. The comments in this regard in the following text apply not only to the embodiment in accordance with FIGS. 6 and 9, but rather also in an analogous way to the remaining embodiments.

In accordance with the number of lugs 47, that is, at least three and in this case six, the same number and corresponding position of connecting elements 38 is provided, the carrier ring 2 being held via the connecting elements 38 and by means of in each case one associated bearing 39. The connecting elements 38 are configured as locating pins, the center axis of which is oriented radially with respect to the longitudinal axis 40 of the turbine casing 1. The connecting elements 38 which are configured as locating pins engage without play into the locating bores 41 of the lugs 47 (FIGS. 4 and 8), with the result that the lugs 47 can be displaced relative to the locating pins in the direction of their center axis, but are fixed in the remaining spatial directions. In other words, in each case one bearing 39 (FIG. 9) is formed on each lug 47, which bearing 39 can be displaced in the longitudinal direction of the respective connecting element 38 or radially with respect to the longitudinal axis 40 of the turbine casing 1 in accordance with the double arrow which is shown in FIG. 9, whereas it is fixed, however, in an axially parallel manner with respect to the longitudinal axis 40 and also in the circumferential direction. Thermally induced deformations in the radial direction can be compensated for as a result, whereas at the same time the transfer of heat from the casing structural unit comprising the carrier ring 2 and the ring contour unit 3 to the surrounding casing 37 is reduced considerably.

The surrounding casing 37 comprises a main body 42 and an intermediate ring 43 which is fastened to the latter. The connecting elements 38 are let into the intermediate ring 43 and are fastened to it as a result. The intermediate ring 43 is for its part fastened to the main body 42, as a result of which fastening of the connecting elements 38 to the surrounding casing 37 is produced overall. The intermediate ring 43 lies by means of a structured surface 44 on the main body 42. The structured surface 44 is configured on the intermediate ring 43, but can also be configured on the main body 42 as an alternative or in addition, and serves to reduce the transfer of heat from the connecting elements 38 to the main body 42. It can be formed by way of a honeycomb pattern, a bump pattern or the like, and, in the embodiment which is shown, has the form of ribs 45 which are spaced apart from one another and run in the circumferential direction with intermediate spaces. For a further reduction of the input of heat into the surrounding casing 37, the fastening region of the connecting elements 38 is also covered at least partially by means of a thermal insulation 46 with respect to the structural unit comprising the carrier ring 2 and the ring contour component 3.

In all the embodiments which are shown, the seals 17 are braced in the axial direction between the corresponding flange 5 of the ring contour component 3 and the associated end face 4 of the carrier ring 2. A seal in the radial direction can also be practical, however. Unless described expressly otherwise or shown otherwise in the drawing, the embodiments in accordance with FIGS. 3 to 9 correspond to one another in respect of the remaining features, designations and optional embodiments.

It is understood that the foregoing description is that of the preferred embodiments of the invention and that various changes and modifications may be made thereto without departing from the spirit and scope of the invention as defined in the appended claims.

What is claimed is:

1. A turbine being one of a radial turbine and a mixed-flow turbine; the turbine comprising:
    a turbine housing;
    a turbine wheel arranged in said turbine housing;
    said turbine housing including a carrier ring having an annular end face; and, a ring contour component enclosing said turbine wheel in a manner so as to conduct a flow;
    said ring contour component having a circumferential flange in contact engagement with said annular end face of said carrier ring;
    a plurality of hold downs for releasably fixing said circumferential flange against said annular end face;
    said turbine housing further including a surrounding casing defining a longitudinal axis;
    at least three connecting elements holding said carrier ring on said surrounding casing with at least three displaceable bearings corresponding to respective ones of said connecting elements;
    each one of said connecting elements defining a longitudinal direction and each of said bearings being configured to be displaceable in the longitudinal direction thereof;
    said turbine being configured to be part of a micro gas turbine;
    each of said hold downs including a stud bolt projecting from said annular end face of said carrier ring;
    said stud bolts each having an outer thread formed thereon;
    a plurality of nuts threadably engaging corresponding ones of said stud bolts for axially clamping said ring contour to said annular end face;
    said circumferential flange and said annular end face conjointly defining an interface;
    a sealing ring and at least one spacer being arranged at said interface; and,
    said sealing ring and said at least one spacer lying independently of each other on said annular end face and on said circumferential flange viewed in the direction of said longitudinal axis.

2. The turbine of claim 1, wherein said at least three connecting elements are oriented radially with respect to said longitudinal axis.

3. The turbine of claim 1, wherein said carrier ring has locating bores formed therein; and, said at least three connecting elements are configured as respective locating pins guided in corresponding ones of locating bores.

4. The turbine of claim 1, wherein said surrounding casing includes a base body and an intermediate ring attached thereto; said connecting elements are held on said intermediate ring; and, said intermediate ring defines a structured surface and is disposed so as to lie on said base body via said structured surface.

5. The turbine of claim 4, wherein said structured surface is configured as a plurality of mutually spaced ribs.

6. The turbine of claim 1, wherein said carrier ring and said ring contour component conjointly define a building component; said connecting elements define a connecting region on said surrounding casing; and, wherein said turbine further includes a thermal insulation covering said connecting region at least partially with respect to said building component.

7. The turbine of claim 1, wherein said carrier ring is a guide ring having inlet vanes.

8. The turbine of claim 1, wherein said micro gas turbine is a micro gas turbine in a combined heat and power cogeneration system.

9. A micro gas turbine comprising:
    a turbine unit including one of a radial turbine unit and a mixed-flow turbine unit;
    said turbine unit including:
    a turbine housing;
    a turbine wheel arranged in said turbine housing;
    said turbine housing including a carrier ring having an annular end face; and, a ring contour component enclosing said turbine wheel in a manner so as to conduct a flow;
    said ring contour component having a circumferential flange in contact engagement with said annular end face of said carrier ring;
    a plurality of hold downs for releasably fixing said circumferential flange against said annular end face;
    said turbine housing further including a surrounding casing defining a longitudinal axis;
    at least three connecting elements holding said carrier ring on said surrounding casing with at least three displaceable bearings corresponding to respective ones of said connecting elements;
    each one of said connecting elements defining a longitudinal direction and each of said bearings being configured to be displaceable in the longitudinal direction thereof;
    each of said hold downs including a stud bolt projecting from said annular end face of said carrier ring;
    said stud bolts each having an outer thread formed thereon;
    a plurality of nuts threadably engaging corresponding ones of said stud bolts for axially clamping said ring contour to said annular end face;
    said circumferential flange and said annular end face conjointly defining an interface;
    a sealing ring and at least one spacer being arranged at said interface; and, said sealing ring and said at least one spacer lying independently of each other on said annular end face and on said circumferential flange viewed in the direction of said longitudinal axis.

\* \* \* \* \*